US012682371B2

(12) United States Patent
Rule et al.

(10) Patent No.: US 12,682,371 B2
(45) Date of Patent: *Jul. 14, 2026

(54) VERIFIED REVIEWS USING A CONTACTLESS CARD

(71) Applicant: Capital One Services, LLC, McLean, VA (US)

(72) Inventors: Jeffrey Rule, Chevy Chase, MD (US); Rajko Ilincic, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/757,764

(22) Filed: Jun. 28, 2024

(65) Prior Publication Data

US 2024/0354795 A1 Oct. 24, 2024

Related U.S. Application Data

(63) Continuation of application No. 17/870,904, filed on Jul. 22, 2022, now Pat. No. 12,051,084, which is a (Continued)

(51) Int. Cl.
*G06Q 30/0217* (2023.01)
*G06Q 20/34* (2012.01)
(Continued)

(52) U.S. Cl.
CPC ....... *G06Q 30/0217* (2013.01); *G06Q 20/352* (2013.01); *G06Q 30/0215* (2013.01); *G06Q 30/0238* (2013.01)

(58) Field of Classification Search
CPC ............. G06Q 30/0217; G06Q 20/352; G06Q 30/0215; G06Q 30/0238; G06Q 20/3563;

(Continued)

(56) References Cited

U.S. PATENT DOCUMENTS

| | | | |
|---|---|---|---|
| 5,590,038 A | 12/1996 | Pitroda |
| 5,666,415 A | 9/1997 | Kaufman |

(Continued)

FOREIGN PATENT DOCUMENTS

| | | | |
|---|---|---|---|
| CN | 101192295 A | 6/2008 |
| CN | 104081382 A | 10/2014 |

(Continued)

OTHER PUBLICATIONS

Tao Yin; A study on fraud reviews: Incentives to manipulate and effect on sales; Mar. 2019; IEEE, China Communications vol. 16 Issue 3.*

(Continued)

*Primary Examiner* — Arthur Duran
(74) *Attorney, Agent, or Firm* — KDW FIRM PLLC

(57) ABSTRACT

Systems, methods, articles of manufacture, and computer-readable media for verified reviews. An application may receive an indication to generate a review. An application programming interface (API) of the application may receive, from a communications interface of a contactless card, encrypted data generated by the contactless card. The API of the application may transmit, to an authentication server: the encrypted data, an indication of the application, and an identifier associated with the entity. The API of the application may receive indications specifying that the authentication server decrypted the encrypted data and determined that the contactless card was used to make a purchase with the entity. The application may permit, based on the indications received from the authentication server, generation of the review. The application may publish the review to one or more review platforms associated with the application.

20 Claims, 12 Drawing Sheets

Related U.S. Application Data continuation of application No. 17/081,613, filed on Oct. 27, 2020, now Pat. No. 11,429,995, which is a continuation of application No. 16/514,094, filed on Jul. 17, 2019, now Pat. No. 10,832,271.

(51) Int. Cl.
　　*G06Q 30/0207*　　　(2023.01)
　　*G06Q 30/0238*　　　(2023.01)

(58) Field of Classification Search
　　CPC ........... G06Q 30/0282; G06Q 30/0185; G06Q
　　　　　　　　30/0248; G07F 7/0866; G06F 21/34;
　　　　　　　　　　　　　　　　　　G06F 21/44
　　See application file for complete search history.

(56) References Cited

U.S. PATENT DOCUMENTS

| | | | |
|---|---|---|---|
| 6,199,114 | B1 | 3/2001 | White |
| 6,324,271 | B1 | 11/2001 | Sawyer |
| 6,367,011 | B1 | 4/2002 | Lee |
| 6,572,015 | B1 | 6/2003 | Norton |
| 7,252,242 | B2 | 8/2007 | Ho |
| 7,270,276 | B2 | 9/2007 | Vayssiere |
| 7,287,692 | B1 | 10/2007 | Patel |
| 7,374,099 | B2 | 5/2008 | de Jong |
| 7,527,208 | B2 | 5/2009 | Hammad |
| 7,568,631 | B2 | 8/2009 | Gibbs |
| 7,584,153 | B2 | 9/2009 | Brown |
| 7,628,322 | B2 | 12/2009 | Holtmanns |
| 7,793,851 | B2 | 9/2010 | Mullen |
| 7,801,799 | B1 | 9/2010 | Brake, Jr. |
| 7,908,216 | B1 | 3/2011 | Davis |
| 7,922,082 | B2 | 4/2011 | Muscato |
| 8,010,405 | B1 | 8/2011 | Bortolin |
| 8,074,877 | B2 | 12/2011 | Mullen |
| 8,082,450 | B2 | 12/2011 | Frey |
| 8,108,687 | B2 | 1/2012 | Ellis |
| 8,186,602 | B2 | 5/2012 | Itay |
| 8,196,131 | B1 | 6/2012 | von Behren |
| 8,249,654 | B1 | 8/2012 | Zhu |
| 8,276,814 | B1 | 10/2012 | Davis |
| 8,332,272 | B2 | 12/2012 | Fisher |
| 8,346,670 | B2 | 1/2013 | Hasson |
| 8,511,547 | B2 | 8/2013 | Rans |
| 8,519,822 | B2 | 8/2013 | Riegebauer |
| 8,750,514 | B2 | 6/2014 | Gallo |
| 8,870,081 | B2 | 10/2014 | Olson |
| 9,038,893 | B2 | 5/2015 | Kirkham |
| 9,129,199 | B2 | 9/2015 | Spodak |
| 9,183,490 | B2 | 11/2015 | Moreton |
| 9,275,325 | B2 | 3/2016 | Newcombe |
| 9,286,606 | B2 | 3/2016 | Diamond |
| 9,306,753 | B1 | 4/2016 | Vandervort |
| 9,501,776 | B2 | 11/2016 | Martin |
| 9,710,744 | B2 | 7/2017 | Wurmfeld |
| 9,949,065 | B1 | 4/2018 | Zarakas |
| 9,965,632 | B2 | 5/2018 | Zarakas |
| 9,965,911 | B2 | 5/2018 | Wishne |
| 9,977,890 | B2 | 5/2018 | Alberti |
| 9,978,056 | B2 | 5/2018 | Seo |
| 9,978,058 | B2 | 5/2018 | Wurmfeld |
| 9,990,795 | B2 | 6/2018 | Wurmfeld |
| 10,007,873 | B2 | 6/2018 | Heo |
| 10,013,693 | B2 | 7/2018 | Wyatt |
| 10,121,130 | B2 | 11/2018 | Pinski |
| 10,210,505 | B2 | 2/2019 | Zarakas |
| 10,242,368 | B1 | 3/2019 | Poole |
| 10,296,910 | B1 | 5/2019 | Templeton |
| 10,332,102 | B2 | 6/2019 | Zarakas |
| 10,360,557 | B2 | 7/2019 | Locke |
| 10,380,471 | B2 | 8/2019 | Locke |
| 10,395,244 | B1 | 8/2019 | Mossler |
| 10,453,054 | B2 | 10/2019 | Zarakas |
| 10,474,941 | B2 | 11/2019 | Wurmfeld |
| 10,475,027 | B2 | 11/2019 | Guise |
| 10,482,453 | B2 | 11/2019 | Zarakas |
| 10,482,457 | B2 | 11/2019 | Poole |
| 10,489,774 | B2 | 11/2019 | Zarakas |
| 10,489,781 | B1 | 11/2019 | Osborn |
| 10,510,070 | B2 | 12/2019 | Wurmfeld |
| 10,515,361 | B2 | 12/2019 | Zarakas |
| 10,535,068 | B2 | 1/2020 | Locke |
| 10,546,444 | B2 | 1/2020 | Osborn |
| 10,581,611 | B1 | 3/2020 | Osborn |
| 10,664,830 | B1 | 5/2020 | Rule |
| 10,685,349 | B2 | 6/2020 | Brickell |
| 10,797,882 | B2 | 10/2020 | Rule |
| 10,880,741 | B2 | 12/2020 | Zarakas |
| 10,909,525 | B1 | 2/2021 | Dhodapkar |
| 10,970,691 | B2 | 4/2021 | Koeppel |
| 10,984,416 | B2 | 4/2021 | Ilincic |
| 11,037,136 | B2 | 6/2021 | Rule |
| 11,062,098 | B1 | 7/2021 | Bergeron |
| 11,120,453 | B2 | 9/2021 | Rule |
| 11,138,593 | B1 | 10/2021 | Ho |
| 11,138,605 | B2 | 10/2021 | Aabye |
| 11,176,540 | B2 | 11/2021 | Gupta |
| 11,188,908 | B2 | 11/2021 | Locke |
| 11,216,806 | B2 | 1/2022 | Mossler |
| 11,297,958 | B2 | 4/2022 | Vukich |
| 11,334,872 | B2 | 5/2022 | Phillips |
| 11,361,173 | B2 | 6/2022 | Edwards |
| 11,392,933 | B2 | 7/2022 | Mossler |
| 11,392,935 | B2 | 7/2022 | Suresh |
| 11,416,844 | B1 | 8/2022 | Osterkamp |
| 11,423,392 | B1 | 8/2022 | Ho |
| 11,443,292 | B2 | 9/2022 | Sherif |
| 11,444,770 | B2 | 9/2022 | Wieker |
| 11,461,764 | B2 | 10/2022 | Rule |
| 11,481,764 | B2 | 10/2022 | Shakkarwar |
| 11,521,213 | B2 | 12/2022 | Rule |
| 11,551,200 | B1 | 1/2023 | Cook |
| 11,556,918 | B2 | 1/2023 | Mestre |
| 11,615,395 | B2 | 3/2023 | McHugh |
| 11,777,933 | B2 | 10/2023 | Moreton |
| 2003/0220876 | A1 | 11/2003 | Burger |
| 2005/0156026 | A1 | 7/2005 | Ghosh |
| 2005/0228997 | A1 | 10/2005 | Bicker |
| 2005/0269402 | A1 | 12/2005 | Spitzer |
| 2007/0276765 | A1 | 11/2007 | Hazel |
| 2008/0082452 | A1 | 4/2008 | Wankmueller |
| 2008/0099552 | A1 | 5/2008 | Grillion |
| 2009/0143104 | A1 | 6/2009 | Loh |
| 2009/0235339 | A1 | 9/2009 | Mennes |
| 2009/0282264 | A1 | 11/2009 | Amiel |
| 2011/0113245 | A1 | 5/2011 | Varadarajan |
| 2011/0155801 | A1 | 6/2011 | Rowberry |
| 2011/0244795 | A1 | 10/2011 | Sueyoshi |
| 2012/0143703 | A1 | 6/2012 | Wall |
| 2013/0030997 | A1 | 1/2013 | Spodak |
| 2013/0041823 | A1* | 2/2013 | Wagner ................ G06Q 20/382 705/44 |
| 2013/0146657 | A1 | 6/2013 | Graef |
| 2013/0211937 | A1 | 8/2013 | Elbirt |
| 2013/0226797 | A1* | 8/2013 | Jiang .................. G06Q 20/3552 705/44 |
| 2013/0311363 | A1 | 11/2013 | Ramaci |
| 2014/0074637 | A1 | 3/2014 | Hammad |
| 2014/0074655 | A1 | 3/2014 | Lim |
| 2014/0081785 | A1 | 3/2014 | Valadas Preto |
| 2014/0114876 | A1 | 4/2014 | Montano |
| 2014/0114877 | A1 | 4/2014 | Montano |
| 2014/0365377 | A1 | 12/2014 | Salama |
| 2015/0032635 | A1 | 1/2015 | Guise |
| 2015/0073983 | A1 | 3/2015 | Bartenstein |
| 2015/0113271 | A1 | 4/2015 | Jooste |
| 2015/0134513 | A1 | 5/2015 | Olson |
| 2015/0199673 | A1 | 7/2015 | Savolainen |
| 2015/0199863 | A1 | 7/2015 | Scoggins |
| 2015/0254637 | A1 | 9/2015 | Yang |
| 2015/0317295 | A1 | 11/2015 | Sherry |

(56)        References Cited

U.S. PATENT DOCUMENTS

| | | | |
|---|---|---|---|
| 2015/0372811 A1* | 12/2015 | Le Saint | H04L 63/068 |
| | | | 705/76 |
| 2016/0078430 A1 | 3/2016 | Douglas | |
| 2016/0189143 A1 | 6/2016 | Koeppel | |
| 2016/0203527 A1* | 7/2016 | Grasso | G06Q 30/0282 |
| | | | 705/51 |
| 2016/0247111 A1* | 8/2016 | Blumenthal | G06Q 30/0217 |
| 2016/0253651 A1 | 9/2016 | Park | |
| 2016/0277383 A1 | 9/2016 | Guyomarc'h | |
| 2016/0283946 A1 | 9/2016 | Laporta | |
| 2016/0307189 A1 | 10/2016 | Zarakas | |
| 2016/0314472 A1 | 10/2016 | Ashfield | |
| 2016/0379217 A1 | 12/2016 | Hammad | |
| 2017/0017957 A1 | 1/2017 | Radu | |
| 2017/0039566 A1 | 2/2017 | Schipperheijn | |
| 2017/0068950 A1 | 3/2017 | Kwon | |
| 2017/0330173 A1 | 11/2017 | Woo | |
| 2018/0039987 A1 | 2/2018 | Molino | |
| 2018/0268132 A1 | 9/2018 | Buer | |
| 2018/0300716 A1 | 10/2018 | Carlson | |
| 2019/0172055 A1 | 6/2019 | Hale | |
| 2019/0303945 A1 | 10/2019 | Mitra | |
| 2021/0004806 A1 | 1/2021 | Noe | |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | | |
|---|---|---|---|
| GB | 2516861 A | 2/2015 |
| GB | 2551907 A | 1/2018 |
| JP | 2002007637 A | 1/2002 |
| JP | 2011210140 A | 10/2011 |
| JP | 2012226681 A | 11/2012 |
| JP | 2016110544 A | 6/2016 |
| KR | 20150140132 A | 12/2015 |
| WO | 9910824 A1 | 3/1999 |
| WO | 0049586 A1 | 8/2000 |
| WO | 2013155562 A1 | 10/2013 |
| WO | 2015183818 A1 | 12/2015 |
| WO | 2017047855 A1 | 3/2017 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive. org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8): 173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

200

204

201

202

203

210

201

202

203

300

310

| POS DEVICE 301 |
| --- |
| WELCOME! PLEASE TAP YOUR CARD TO SEE IF YOU QUALIFY FOR REWARDS. READING CARD DATA.... |

| POS DEVICE 301 |
| --- |
| SUCCESS! REVIEW DETECTED. THANK YOU FOR WRITING A REVIEW ABOUT US. PLEASE SELECT ONE OF THE FOLLOWING REWARDS:<br><br>○ $3 OFF YOUR LAST PURCHASE<br>⊗ 10% OFF YOUR NEXT PURCHASE<br><br>SELECTION RECEIVED! ENJOY! |

101

400

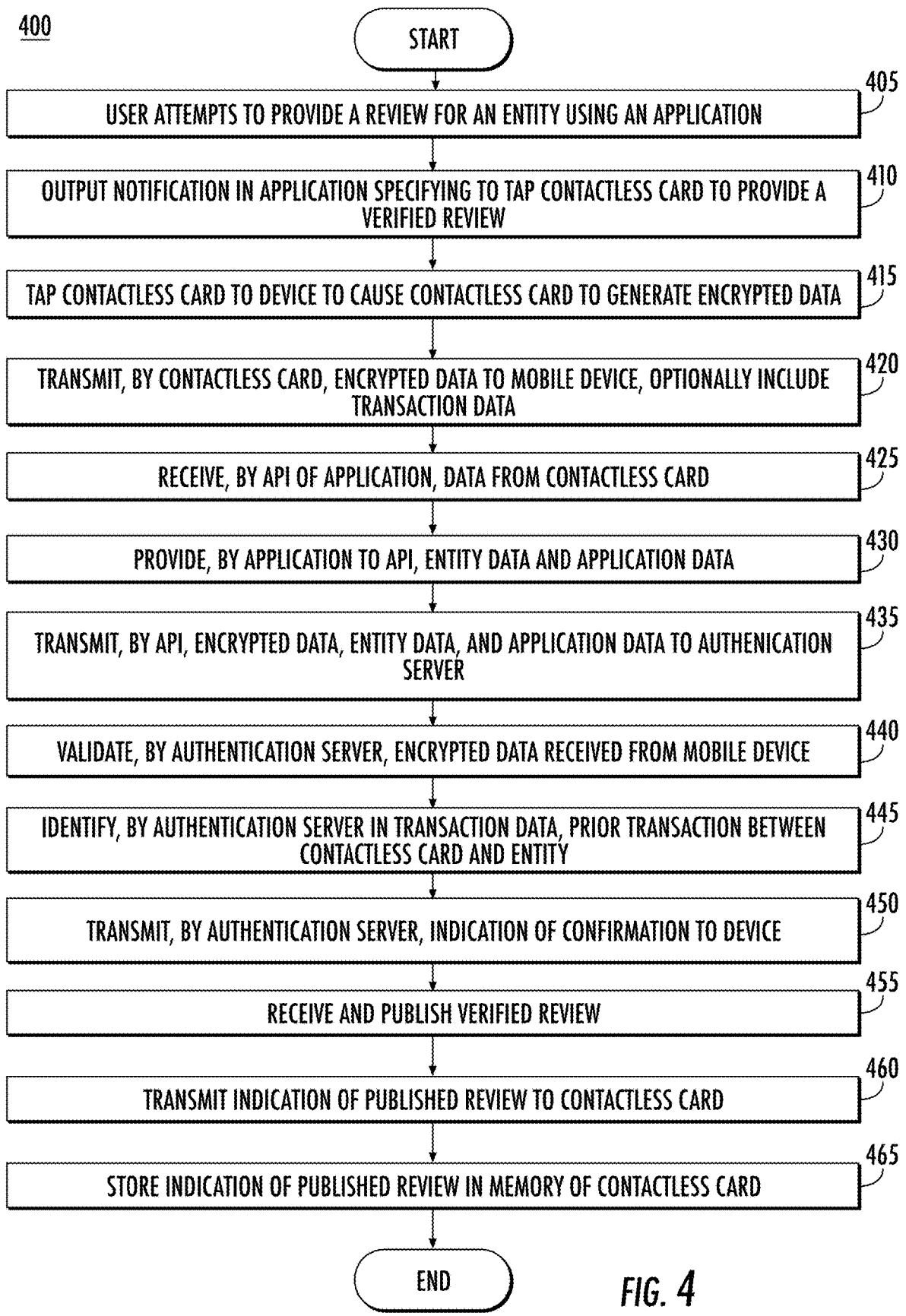

START

USER ATTEMPTS TO PROVIDE A REVIEW FOR AN ENTITY USING AN APPLICATION 405

OUTPUT NOTIFICATION IN APPLICATION SPECIFYING TO TAP CONTACTLESS CARD TO PROVIDE A VERIFIED REVIEW 410

TAP CONTACTLESS CARD TO DEVICE TO CAUSE CONTACTLESS CARD TO GENERATE ENCRYPTED DATA 415

TRANSMIT, BY CONTACTLESS CARD, ENCRYPTED DATA TO MOBILE DEVICE, OPTIONALLY INCLUDE TRANSACTION DATA 420

RECEIVE, BY API OF APPLICATION, DATA FROM CONTACTLESS CARD 425

PROVIDE, BY APPLICATION TO API, ENTITY DATA AND APPLICATION DATA 430

TRANSMIT, BY API, ENCRYPTED DATA, ENTITY DATA, AND APPLICATION DATA TO AUTHENICATION SERVER 435

VALIDATE, BY AUTHENTICATION SERVER, ENCRYPTED DATA RECEIVED FROM MOBILE DEVICE 440

IDENTIFY, BY AUTHENTICATION SERVER IN TRANSACTION DATA, PRIOR TRANSACTION BETWEEN CONTACTLESS CARD AND ENTITY 445

TRANSMIT, BY AUTHENTICATION SERVER, INDICATION OF CONFIRMATION TO DEVICE 450

RECEIVE AND PUBLISH VERIFIED REVIEW 455

TRANSMIT INDICATION OF PUBLISHED REVIEW TO CONTACTLESS CARD 460

STORE INDICATION OF PUBLISHED REVIEW IN MEMORY OF CONTACTLESS CARD 465

END

FIG. 4

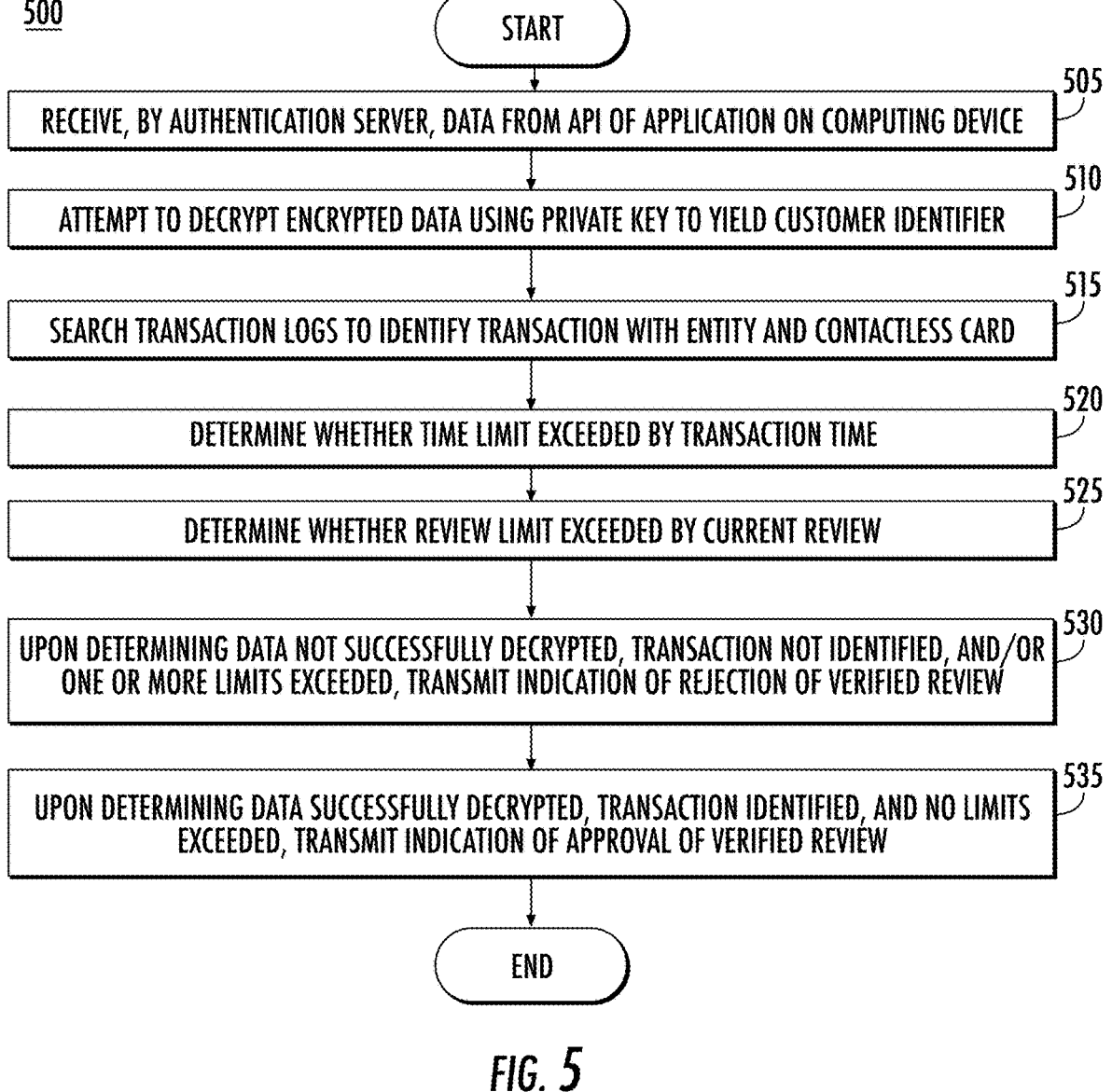

500

START

RECEIVE, BY AUTHENTICATION SERVER, DATA FROM API OF APPLICATION ON COMPUTING DEVICE ⌐505

ATTEMPT TO DECRYPT ENCRYPTED DATA USING PRIVATE KEY TO YIELD CUSTOMER IDENTIFIER ⌐510

SEARCH TRANSACTION LOGS TO IDENTIFY TRANSACTION WITH ENTITY AND CONTACTLESS CARD ⌐515

DETERMINE WHETHER TIME LIMIT EXCEEDED BY TRANSACTION TIME ⌐520

DETERMINE WHETHER REVIEW LIMIT EXCEEDED BY CURRENT REVIEW ⌐525

UPON DETERMINING DATA NOT SUCCESSFULLY DECRYPTED, TRANSACTION NOT IDENTIFIED, AND/OR ONE OR MORE LIMITS EXCEEDED, TRANSMIT INDICATION OF REJECTION OF VERIFIED REVIEW ⌐530

UPON DETERMINING DATA SUCCESSFULLY DECRYPTED, TRANSACTION IDENTIFIED, AND NO LIMITS EXCEEDED, TRANSMIT INDICATION OF APPROVAL OF VERIFIED REVIEW ⌐535

END

FIG. 5

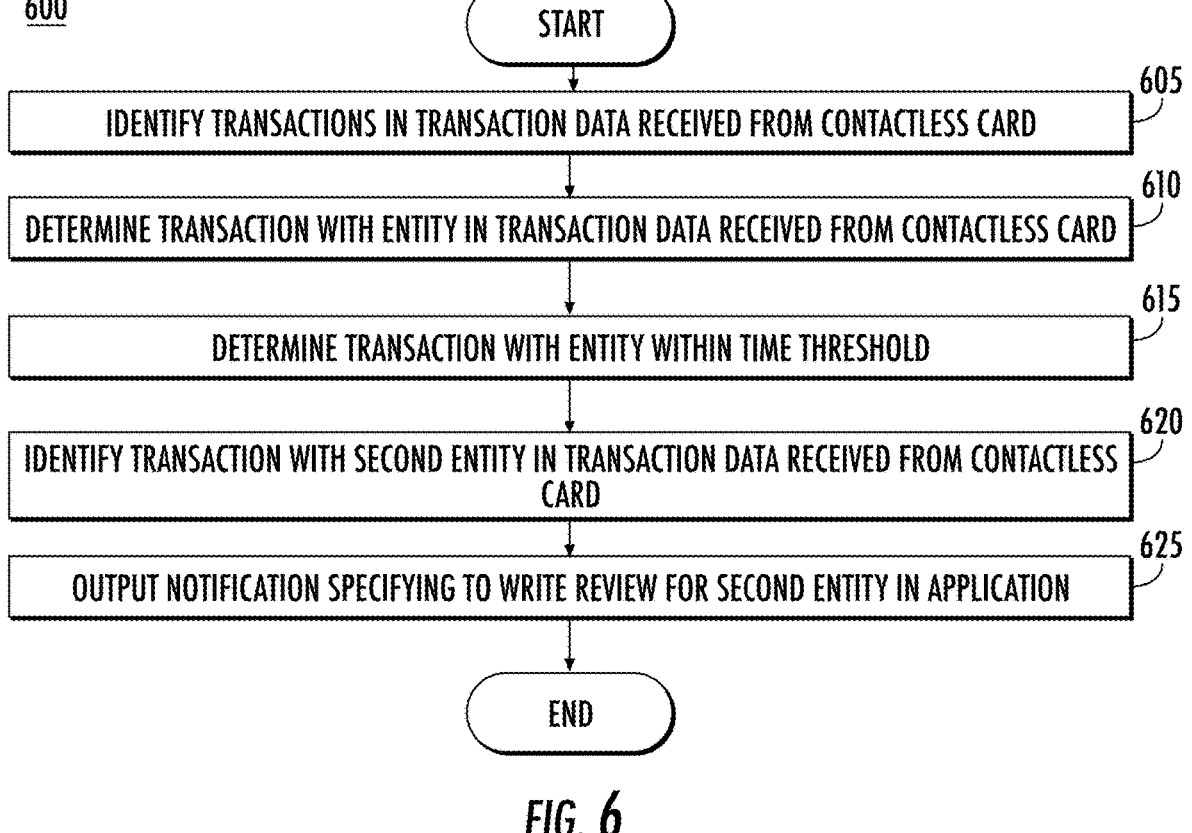

600

START

IDENTIFY TRANSACTIONS IN TRANSACTION DATA RECEIVED FROM CONTACTLESS CARD
605

DETERMINE TRANSACTION WITH ENTITY IN TRANSACTION DATA RECEIVED FROM CONTACTLESS CARD
610

DETERMINE TRANSACTION WITH ENTITY WITHIN TIME THRESHOLD
615

IDENTIFY TRANSACTION WITH SECOND ENTITY IN TRANSACTION DATA RECEIVED FROM CONTACTLESS CARD
620

OUTPUT NOTIFICATION SPECIFYING TO WRITE REVIEW FOR SECOND ENTITY IN APPLICATION
625

END

*FIG. 6*

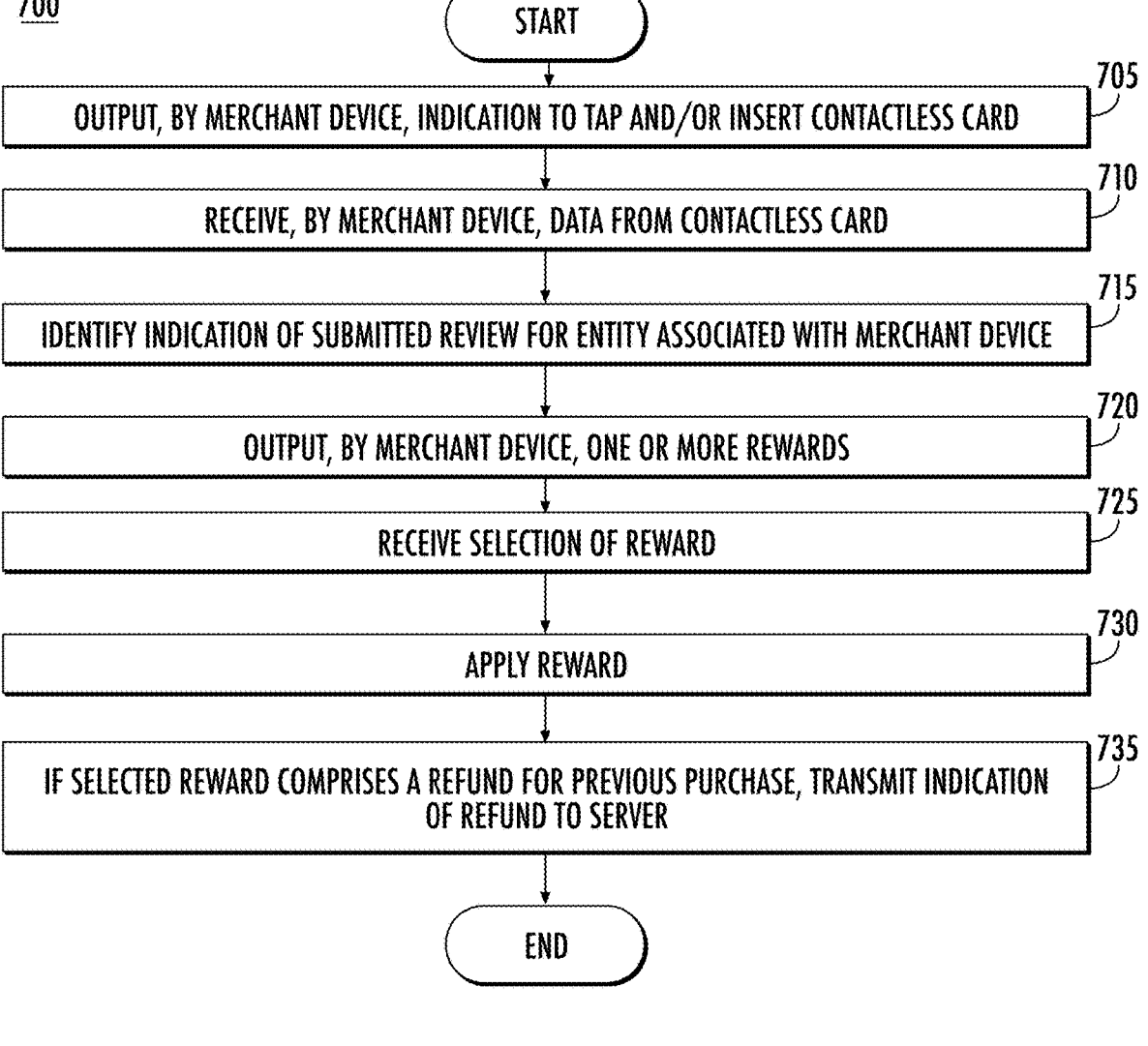

700

START

OUTPUT, BY MERCHANT DEVICE, INDICATION TO TAP AND/OR INSERT CONTACTLESS CARD ⟩705

RECEIVE, BY MERCHANT DEVICE, DATA FROM CONTACTLESS CARD ⟩710

IDENTIFY INDICATION OF SUBMITTED REVIEW FOR ENTITY ASSOCIATED WITH MERCHANT DEVICE ⟩715

OUTPUT, BY MERCHANT DEVICE, ONE OR MORE REWARDS ⟩720

RECEIVE SELECTION OF REWARD ⟩725

APPLY REWARD ⟩730

IF SELECTED REWARD COMPRISES A REFUND FOR PREVIOUS PURCHASE, TRANSMIT INDICATION OF REFUND TO SERVER ⟩735

END

FIG. 7

VERIFIED REVIEWS USING A CONTACTLESS CARD

RELATED APPLICATION

This application is a continuation of U.S. patent application Ser. No. 17/870,904, filed Jul. 22, 2022, which is a continuation of U.S. patent application Ser. No. 17/081,613, filed Oct. 27, 2020, which is a continuation of U.S. patent application Ser. No. 16/514,094, titled "VERIFIED REVIEWS USING A CONTACTLESS CARD" filed on Jul. 17, 2019. The contents of the aforementioned applications are incorporated herein by reference in their entirety.

TECHNICAL FIELD

Embodiments herein generally relate to computing platforms, and more specifically, to providing verified reviews using a contactless card.

BACKGROUND

Users often write reviews of products, services, restaurants, and the like. Such reviews are often valuable sources for user sentiment that can be used to improve the quality of associated offerings. However, due to the impact positive reviews have on sales, fake reviews are often posted to boost sales. Similarly, fake reviews may be posted to negatively impact competitor sales. Therefore, users are often unable to trust reviews, as there is uncertainty as to whether the review was written by a person who ate at a restaurant or used the product or service.

SUMMARY

Embodiments disclosed herein provide systems, methods, articles of manufacture, and computer-readable media for providing verified reviews using a contactless card. According to one example, an application may receive an indication specifying to generate a review for an entity comprising one or more of a merchant and a service provider. The application may output an indication specifying to tap a contactless card to a device. An application programming interface (API) of the application may receive, from a communications interface of the contactless card, encrypted data generated by the contactless card using a cryptographic algorithm, a customer identifier, and a private key stored in the memory of the contactless card. The API of the application may transmit, to an authentication server associated with the contactless card: (i) the encrypted data, (ii) an indication of the application, and (iii) an entity identifier associated with the entity. The API of the application may receive, from the authentication server, indications specifying that the authentication server: (i) decrypted the encrypted data using a copy of the private key stored by the server to yield the customer identifier, and (ii) determined that the contactless card was used to make a purchase with the entity based at least in part on the entity identifier and the decrypted customer identifier. The application may permit, based on the indications received from the authentication server, generation of the review. The application may publish the review to one or more review platforms associated with the application.

According to another example, an authentication server may receive, from a review application, an indication specifying to generate a review for an entity comprising one or more of a merchant and a service provider. The authentication server may receive, from an application programming interface (API) of the review application, encrypted data received by the review application from a contactless card and an entity identifier associated with the entity, the encrypted data based on a cryptographic algorithm, a customer identifier, and a private key. The authentication server may decrypt the encrypted data using a copy of the private key stored by the server to yield the customer identifier. The authentication server may determine that the contactless card was used to make a purchase with the entity based at least in part on the entity identifier and the decrypted customer identifier. The authentication server may transmit to the application, permission to generate the review and receive the review from the application. The authentication server may then publish the review to one or more review platforms associated with the application.

BRIEF DESCRIPTION OF THE DRAWINGS

FIG. 4 illustrates an embodiment of a first logic flow.

FIG. 5 illustrates an embodiment of a second logic flow.

FIG. 6 illustrates an embodiment of a third logic flow.

FIG. 7 illustrates an embodiment of a fourth logic flow.

DETAILED DESCRIPTION

Figure 1A:
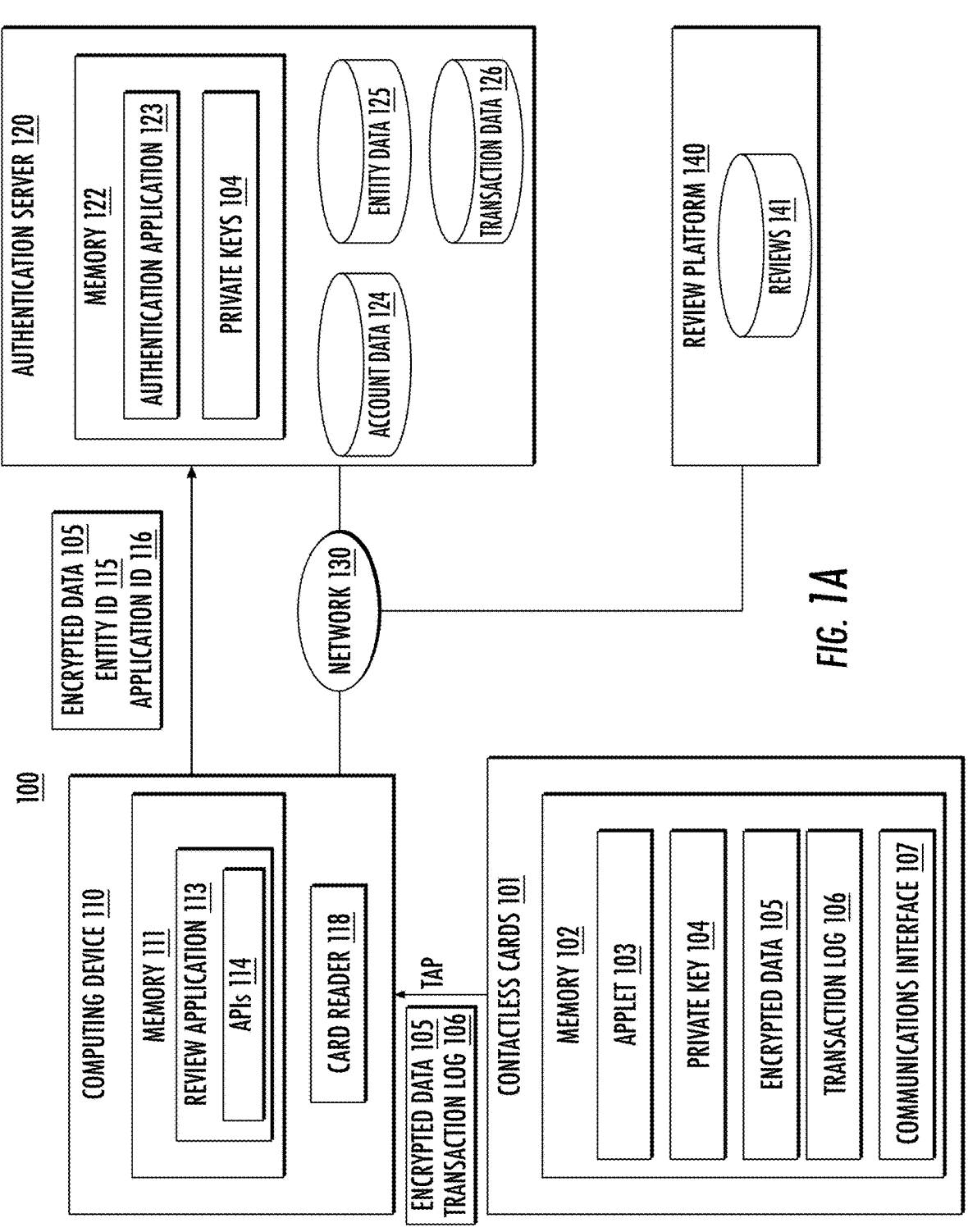
FIGS. 1A-1B illustrate embodiments of a system to provide verified reviews using a contactless card.

Embodiments disclosed herein provide secure techniques for verified reviews using contactless cards. Generally, a user may attempt to provide a review for an entity, such as a restaurant, merchant, and/or a service provider, via a review platform. The review platform may be a website and/or dedicated application having application programming interfaces (APIs) that can communicate with contactless cards and servers associated with the contactless cards. During the review generation and/or submission process, the user may be prompted to tap their contactless card to their computing device. The APIs may communicate with the contactless card to receive encrypted data generated by the contactless card using a private key and a cryptographic algorithm. The APIs may provide the encrypted data along with other review data (e.g., an identifier of the entity that is a subject of the review) to the server. The server may attempt to decrypt the encrypted data generated by the contactless card. If the server is able to decrypt the encrypted data, the server may validate the encrypted data. The server may then determine whether the card was used to pay for a transaction between the user and the entity being reviewed. For example, the server may attempt to identify, in a transaction log, a transaction record indicating the contactless card was used to pay for a transaction between the user and the entity being reviewed. If the server identifies such a transaction record, the server may verify that the user, in fact, conducted a transaction with the entity.

The server may then inform the APIs that the encrypted data was verified and the transaction record was verified. The APIs may allow the user to complete the submission of a verified review using the review platform. Once submitted, the verified review is published to the review platform with an indication that the review is verified (e.g., that the user, in fact, ate at the restaurant, paid for services provided by the service provider, etc.). Furthermore, the APIs may transmit an indication of the submitted review to the contactless card, which may store the indication in a memory of the contactless card. When the user subsequently visits the entity, a POS device of the entity may receive the stored indication from the memory of the contactless card. The POS device may offer a reward, discount, or another incentive to the user when receiving the indication from the contactless card.

Advantageously, embodiments disclosed herein improve the validity and veracity of reviews submitted by users on online platforms by confirming that a reviewing user, in fact, conducted business with the entity subject of the review. Furthermore, the validation performed by the authentication server provides safeguards to ensure that an authorized user who has access to the physical card is requesting to submit the review. Furthermore, by providing secure APIs to communicate with the contactless card and/or servers, embodiments disclosed herein provide a secure, portable solution that can be used with any review platform.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more computing devices 110, an authentication server 120, and one or more review platforms 140. The contactless cards 101 are representative of any type of payment cards, such as a credit card, debit card, ATM card, gift card, and the like. The contactless cards 101 may comprise one or more communications interfaces 107, such as a radio frequency identification (RFID) chip, configured to communicate with the computing devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The computing devices 110 are representative of any type of network-enabled computing devices, such as smartphones, tablet computers, wearable devices, laptops, portable gaming devices, mobile devices, workstations, desktop computers, servers, and the like. The servers 120 and review platforms 140 are representative of any type of computing device, such as a server, workstation, compute cluster, cloud computing platform, virtualized computing system, and the like.

The computing device 110 may be under the control of an instance of an operating system (OS, not pictured). Example operating systems include the Android® OS, iOS®, macOS®, Linux®, and Windows® operating systems. As shown, a memory 111 of the computing device 110 includes a review application 113 that includes one or more application programming interfaces (APIs) 114. The review application 113 allows users to generate reviews 141 for publication on one or more review platforms 140. Using the APIs 114, the review application 113 may allow the users to submit verified (or confirmed) reviews. Generally, the APIs 114 may facilitate communications with the contactless cards 101 and/or the servers 120 to confirm that the contactless card 101 was used to pay for a transaction with an entity that is a subject of the review, thereby providing the verified reviews. The entity subject of the review may include, without limitation, a restaurant, merchant, service provider, or any other type of business for which one or more users may wish to provide a review. As described in greater detail below, the review application 113 and the APIs 114 may be used to confirm that a user, in fact, conducted a transaction with the entity, e.g., ate at the subject restaurant, paid for a service provided by the subject service provider, made a purchase with the subject merchant, etc.

In some embodiments, the review application 113 may be a dedicated application (e.g., a mobile OS application) that is provided by an entity associated with one or more review platforms 140. In other embodiments, the functionality provided by the review application 113 and/or the APIs 114 may be integrated into other platforms, such as one or more web pages and/or services provided by the review platform 140. In such embodiments, the user may access the web pages and/or services provided by the review platform 140 using a web browser (not pictured) or other application. Embodiments are not limited in these contexts.

Generally, a user of the review application 113 may specify to generate a review for an entity. For example, the user may access a page in the review application 113 for a restaurant they recently dined at and specify to generate a new review for the restaurant using the review application 113. In response, the review application 113 may output a notification on the computing device 110 specifying to tap the contactless card 101 to the computing device 110, thereby bringing the contactless card 101 sufficiently close to the card reader 118 of the computing device 110 to enable data transfer (e.g., NFC data transfer, Bluetooth data transfer, etc.) between the communications interface 107 of the contactless card 101 and the card reader 118 of the computing device 110. The applet 103 executing on a processor (not pictured) of the contactless card 101 may then generate and transmit encrypted data 105 to the computing device 110 via the communications interface 107 of the contactless card 101. For example, the applet 103 of the contactless card 101 may use a cryptographic algorithm to generate a cryptographic payload of encrypted data 105 based at least in part on the private key 104 stored in the memory 102 of the contactless card 101. In such an embodiment, the private key 104 and some other piece of data (e.g., a customer identifier, an account identifier, etc.) may be provided as the input to the cryptographic algorithm, which outputs the encrypted data 105. Generally, the applet 103 may use any type of cryptographic algorithm and/or system to generate the encrypted data 105, and the use of a specific cryptographic algorithm as an example herein should not be considered limiting of the disclosure. In some embodiments, the applet 103 may perform encryption using a key diversification technique to generate the encrypted data 105. Examples of key diversification techniques are described in U.S. patent application Ser. No. 16/205,119, filed Nov. 29, 2018. The aforementioned patent application is incorporated by reference herein in its entirety.

In some embodiments, the APIs 114 of the review application 113 may transmit an indication to the contactless card 101 specifying to generate the encrypted data 105. In other embodiments, the applet 103 generates the encrypted data 105 without requiring instructions from the APIs 114. In some embodiments, the APIs 114 of the review application 113 may transmit an entity identifier (ID) 115 to the applet 103. The entity identifier 115 may be any identifier that uniquely identifies an entity (e.g., the restaurant that the user selected to write the review for). In some such embodiments, the applet 103 determines whether the received entity identifier matches (or is like) one or more entity identifiers in the transaction log 106. The transaction log 106 may store details describing one or more recent transactions completed using the contactless card 101. If the received entity identifier is a match, the applet 103 may determine that the user completed a transaction with the entity (e.g., ate at the restaurant) and generate the encrypted data 105. If the received entity identifier is not a match, the applet 103 may refrain from generating the encrypted data 105, as the applet 103 cannot verify that the user completed a transaction with the entity. However, in some embodiments, the applet 103 may generate the encrypted data 105 even if the entity ID 115 is not a match to any portion of the transaction log 106.

Once generated, the applet 103 may transmit the encrypted data 105 to the APIs 114 of the review application 113 of the computing device 110, e.g., via NFC. In some embodiments, the applet 103 may also transmit data describing one or more transactions from the transaction log 106 to the review application 113. In some embodiments, the review application 113 may confirm whether a match exists between the entity ID 115 of the entity subject to the review and the transaction log 106. If a match exists, the review application 113 may permit generation of a verified review. However, in some such embodiments, the review application 113 may request confirmation (and/or verification) from the server 120 prior to permitting submission of the verified review to the review platform 141. The requested confirmation and/or verification may generally allow the review application 113 to confirm that the user, in fact, conducted a transaction with the entity being reviewed, e.g., ate at a restaurant, used a service, etc.

Generally, the APIs 114 of the review application 113 may transmit the encrypted data 105, the entity ID 115, and an application ID 116 to the authentication application 123 of the authentication server 120 via the network 130. The application ID 116 may uniquely identify the review application 113 and/or the associated review platform 140. Doing so may facilitate lookups using entity IDs 115 associated with the review application 113 and entity IDs in the entity data 125, where the entity IDs in the entity data 125 may be used in the transaction data 126. The authentication server 120 may then attempt to decrypt the encrypted data 105 and determine whether the transaction data 126 reflects that the contactless card 101 was used to pay for a transaction with the subject entity.

Figure 1B:
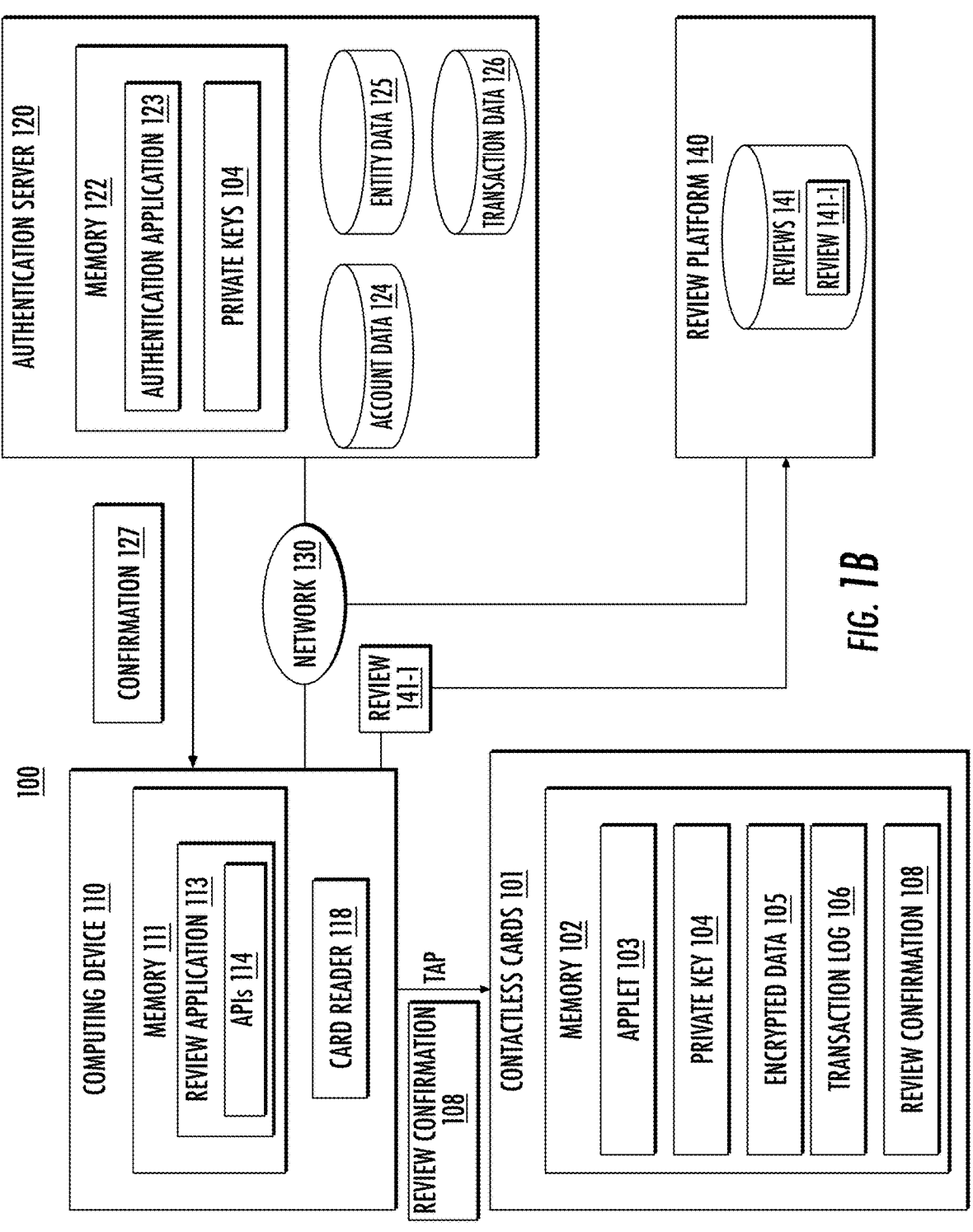

FIG. 1B illustrates an embodiment where the authentication application 123 of the authentication server 120 processes the data received from the review application 113. As stated, the authentication application 123 may attempt to verify the encrypted data 105. For example, the authentication application 123 may attempt to decrypt the encrypted data 105 using a copy of the private key 104 stored in the memory 122 of the authentication server 120. The private key 104 may be identical to the private key 104 stored in the memory 102 of the contactless card 101, where each contactless card 101 is manufactured to include a unique private key 104 (and the authentication server 120 stores a corresponding copy of each unique private key 104). Therefore, the authentication application 123 may successfully decrypt the encrypted data 105, thereby verifying the encrypted data 105. Although the private key 104 is depicted as being stored in the memory 122, the private key 104 may be stored elsewhere, such as in a secure element and/or a hardware security module (HSM). In such embodiments, the secure element and/or the HSM may decrypt the encrypted data 105 using the private key 104 and a cryptographic function.

For example, a customer identifier associated with the contactless card 101 may be used to generate the encrypted data 105. In such an example, the authentication application 123 may decrypt the encrypted data 105 using the private key 104 of the authentication server 120. If the result of the decryption yields the customer identifier associated with the contactless card 101 in the account data 124, the authentication application 123 verifies the encrypted data 105. If the authentication application 123 is unable to decrypt the encrypted data to yield the expected result (e.g., the customer identifier of the account associated with the contactless card 101), the authentication application 123 does not validate the encrypted data 105.

Once the authentication application 123 successfully decrypts the encrypted data 105, the authentication application 123 may then determine whether the transaction data 126 includes a record indicating the contactless card 101 was used to pay for a transaction with the entity the user selected to review. For example, the authentication application 123 may determine whether a transaction record in the transaction data 126 includes an account number of the contactless card and the entity ID 115 of the entity (e.g., the restaurant being reviewed). If such a transaction record exists, the authentication application 123 may transmit an indication of confirmation 127 to the computing device 110. The confirmation 127 may generally reflect that the authentication application 123 verified the encrypted data 105 (by decrypting the encrypted data 105) and verified that the contactless card 101 was used to make a purchase with the entity that is being reviewed. The confirmation 127 may further serve as permission to generate and/or publish the review. If, however, the encrypted data 105 is not decrypted and/or a record in the transaction data 126 is not identified, the authentication application 123 may refrain from generating a confirmation and/or transmit a failure state to the review application 113. In some embodiments, the confirmation 127 may be stored in the account data 124 for the account associated with the contactless card 101. In some embodiments, the confirmation 127 includes metadata attributes such as a time of the confirmation, a time of the identified transaction, the entity ID 115, the application ID 116, and the like.

In some embodiments, the authentication application 123 may determine whether a date of the transaction record in the transaction data 126 is within a time threshold before generating the confirmation 127. For example, if the transaction date is 100 days old, and the time threshold is one week, the authentication application 123 may determine that the transaction record is not valid in light of the threshold, and refrain from transmitting the confirmation 127 to the computing device 110. In some embodiments, the authentication application 123 may resolve the entity ID 115 against the entity data 125 to determine a transaction identifier used to identify the associated entity in the transaction data 126. Similarly, in some embodiments, the authentication application 123 may receive the transaction log 106 from the computing device 110 and confirm that the transaction log 106 of the contactless card 101 reflects a transaction with entity ID 115 prior to generating the confirmation 127. Furthermore, in some embodiments, the authentication application 123 may maintain a counter associated with the contactless card 101. The counter may reflect how many reviews the user associated with the contactless card 101 has attempted to submit. If the counter exceeds a threshold, the authentication application 123 may refrain from validating the encrypted data 105 and/or searching the transaction data 126, thereby preventing the user from submitting an excessive number of reviews and/or from submitting programmatically generated reviews.

The APIs 114 of the review application 113 may receive the confirmation 127 from the server 120 indicating the user made a transaction with the entity associated with the entity ID 115. In response, the review application 113 may allow the user to compose and/or submit a verified review 141-1 for the entity associated with the entity ID 115 to the review platform 140. If the server 120 does not transmit the confirmation 127 (and/or the APIs 114 receive an indication of a rejection and/or failure state from the server 120), the review application 113 may restrict the user from submitting a validated review. In some such embodiments, the review application 113 may permit the user to submit a generic review that is not labelled as a validated review. The review platform 140 and/or the review application 113 may distinguish between generic reviews and/or validated reviews in the reviews 141 using any suitable manner, such as with graphics, text, images, and the like. The review application 113 may further transmit an indication of the review 141-1 to the server 120, which may store an indication of the published review in the account data 124 for the reviewing user.

Once the review 141-1 is submitted to the review platform, the review application 113 may output an indication specifying to tap the contactless card 101 to the computing device 110. Once the contactless card 101 is brought within communications range of the computing device 110, the APIs 114 may transmit a review confirmation 108 to the contactless card 101, which may store the review confirmation 108 in the memory 102. In some embodiments, the review confirmation 108 is the same as the confirmation 127 received from the server 120. In other embodiments, the review confirmation 108 is different than the confirmation 127 received from the server. For example, the review confirmation 108 may include additional metadata describing the review 141-1, such as a timestamp when the review was published, an identifier of the associated user, the entity ID 115 of the entity subject to the review, any metadata of the confirmation 127, whether the review was favorable, unfavorable, etc.

The review application 113 and/or a merchant device may receive the review confirmation 108 from the contactless card 101 at a later time. Doing so may allow the review application 113 and/or the merchant device to offer the user rewards, discounts, and/or other incentives for publishing the review associated with the review confirmation. In some embodiments, the review application 113 may output an indication specifying to submit an additional review. In some such embodiments, the review application 113 may identify other entities in the transaction log 106, and output a notification requesting that the user submit a verified review for the entity identified in the transaction log 106.

In one embodiment, the review application 113 may transmit the review 141-1 to the authentication application 123 responsive to receiving the confirmation 127. The authentication application 113 may then transmit the review 141-1 to the review platform 140 for publication.

Figure 2A:
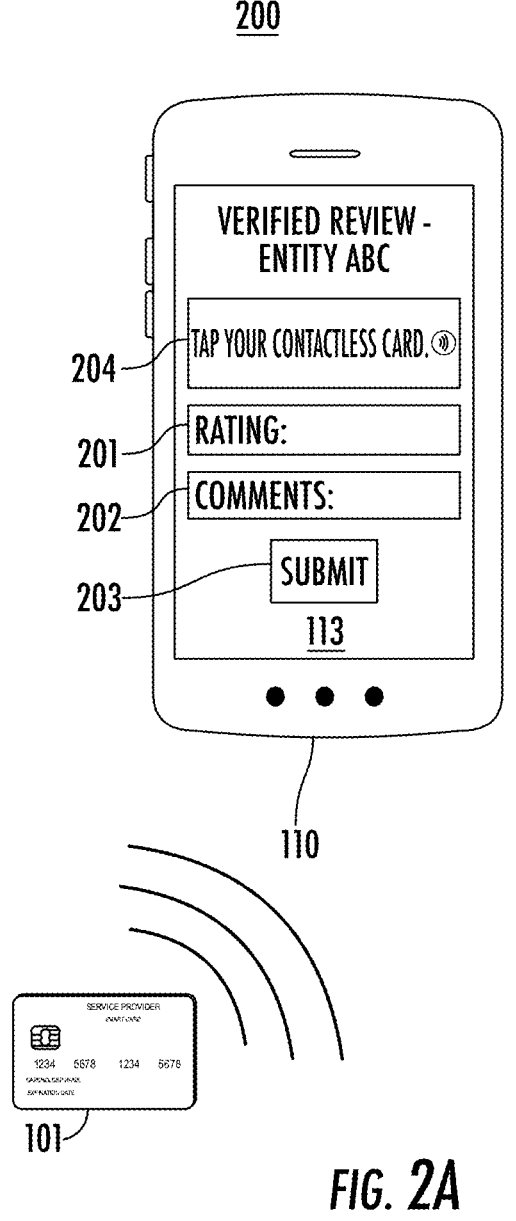
FIGS. 2A-2C illustrate embodiments of using a contactless card to provide verified reviews.

FIG. 2A is a schematic 200 depicting an example embodiment of tapping the contactless card 101 to provide a verified review via the review application 113. As shown, the review application 113 outputs a graphical user interface (GUI) for submitting a verified review for an example entity "Entity ABC". The GUI includes a ratings field 201 for providing a rating. The rating may be a numerical rating, star rating, text-based rating, or any other type of rating. The GUI further includes a comments field 202 which allows the user to provide comments related to the rating. The GUI may further include additional elements, such as fields for providing images, video, etc. The particular type and format of the example verified review should not be considered limiting of the disclosure, as the disclosure is equally applicable to all types of reviews.

In one embodiment, the user may provide input in fields 201-202 and select the submit button 203 to submit the review to the review platform 140. In response, the review application 113 may output a notification 204 specifying to tap the contactless card 101 to the computing device 110. Once the contactless card 101 is tapped to the computing device 110, the applet 103 of the contactless card 101 may generate the encrypted data 105. In some embodiments, the applet 103 may be representative of multiple applets stored in the contactless card 101. In such embodiments, the contactless card 101 may select the applet 103 associated with facilitating verified reviews. The selected applet 103 may then generate the data necessary to facilitate the verified review (e.g., the encrypted data 105) and/or provide additional data necessary to facilitate the verified review (e.g., the transaction log 106).

Once generated, the applet 103 may transmit the encrypted data 105 to the computing device 110 via the communications interface 107. In some embodiments, the applet 103 may transmit the transaction log 106 to the computing device 110 with the encrypted data 105. As stated, in some embodiments, the applet 103 may receive the entity ID 115 from the APIs 114. In such embodiments, the applet 103 may determine whether the transaction log 106 includes a record reflecting that the contactless card 101 was used as part of a transaction with the entity associated with the entity ID 115 prior to generating the encrypted data 105. The APIs 114 of the review application 113 may transmit the encrypted data 105, the transaction log 106, the entity ID 115, and/or the application ID 116 to the authentication server 120. In some embodiments, the receipt of the application ID 116 instructs the authentication server 120 to perform the operations associated with verified reviews (e.g., validating the encrypted data 105 and searching for a matching transaction in the transaction data 126).

The authentication application 123 may then attempt to decrypt the encrypted data 105 using the private key 104 associated with the contactless card 101. If the authentication application 123 is unable to decrypt the encrypted data to yield an expected result (e.g., a customer identifier of the account associated with the contactless card 101, etc.), the authentication application 123 does not validate the encrypted data 105 and does not confirm whether a transaction in the transaction data 126. If the authentication application 123 decrypts the encrypted data to yield an expected result (e.g., the customer identifier of the account associated with the contactless card 101), the authentication application 123 validates the encrypted data 105, and determines whether a transaction in the transaction data 126 reflects that the contactless card 101 was used to pay for a transaction (at least in part) with the entity associated with the entity ID 115. If the transaction is identified and the encrypted data 105 is verified, the authentication application 123 may generate the confirmation and transmit the same to the APIs 114 of the review application 113. In some embodiments, if the authentication application 123 identifies a transaction in the transaction data 126, the authentication application 123 may determine whether a date of the identified transaction is within a threshold for use in generating a verified review before generating the confirmation.

Figure 2B:
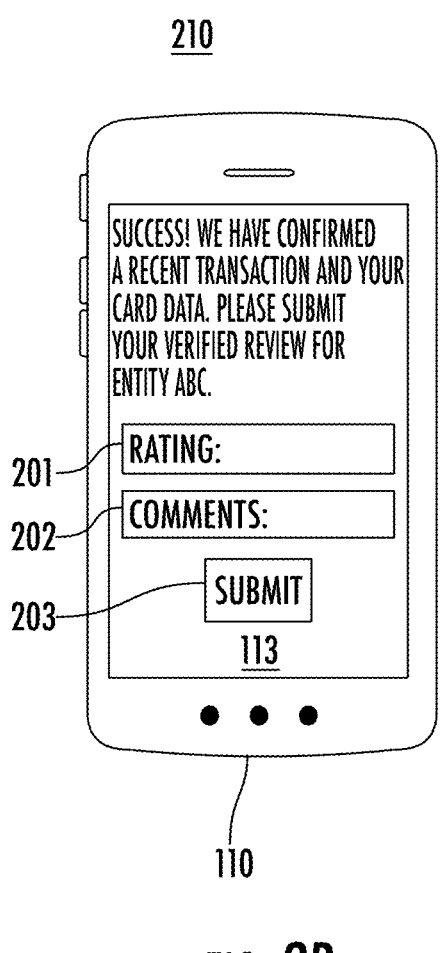

FIG. 2B is a schematic 210 depicting an embodiment where the authentication application 123 verifies the encrypted data 105 and transmits the confirmation to the APIs 114 of the review application 113. The review application 113 may then permit the user to compose and/or submit the verified review. The user may then submit the verified review, which may then be stored as a review 141 of the review platform 140. The user may then edit the review 141 if needed. Other users may also view the verified review in the reviews 141 via the review application 113 and/or other applications.

Figure 2C:
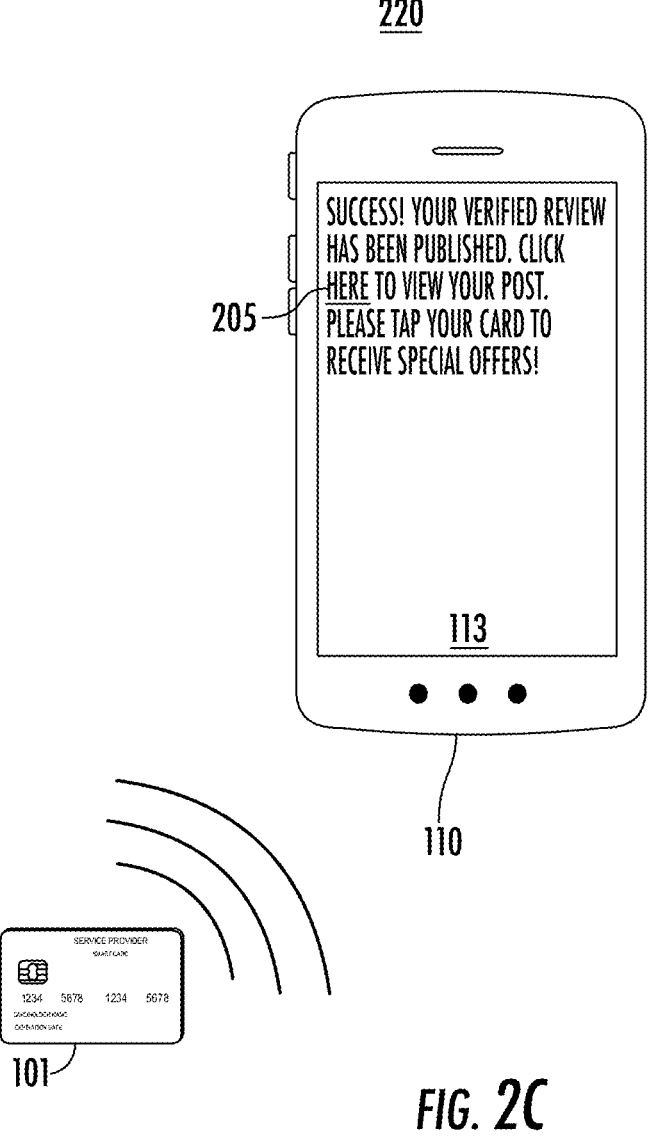

FIG. 2C is a schematic 220 depicting an embodiment where the verified review is published to the reviews 141 of the review platform 140. As shown, the review application 113 may provide a link 205 that allows the user to view the verified review. The review application 113 may also output instructions specifying to tap the contactless card 101 to the device 110. Doing so allows the APIs 114 to transmit the review confirmation 108 to the contactless card 101. The contactless card 101 may store the review confirmation 108 in the memory 102, allowing the review confirmation 108 to be used at a later time for rewards, incentives, etc.

Figures 3A, 3B:
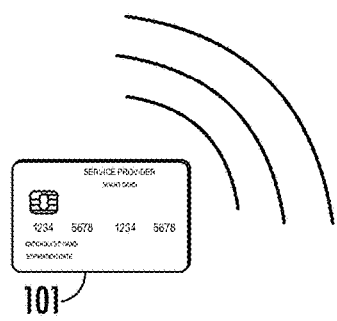
FIGS. 3A-3B illustrate embodiments of using a contactless card to provide verified reviews.

FIG. 3A is a schematic 300 illustrating an example of using the contactless card 101 at a point of sale (POS) device 301 of an entity. The POS device 301 is representative of any type of computing device, such as card reader devices, smartphones, tablet computers, desktop computers, POS terminals, servers, workstations, laptop computers, and the like. As shown, the POS device 301 instructs the user to tap their contactless card 101 to the POS device 301. The user may bring the contactless card 101 in communications range of the POS device 301, which may cause the applet 103 to transmit the review confirmation 108 to the POS device 301. In some embodiments, the contactless card 101 is inserted into a card reader of the POS device 301, and the review confirmation 108 is transmitted via the card reader.

In response, the POS device 301 may analyze the review confirmation 108 to determine whether the associated review qualifies the user to receive a reward or other incentive. For example, the POS device 301 may determine whether the entity ID 115 associated with the review confirmation 108 matches an entity ID associated with the entity providing the POS device 301. As another example, the POS device 301 may determine whether the timestamp associated with the review confirmation 108 indicates that the review confirmation 108 is within a time threshold for providing rewards for reviews. More generally, the POS device 301 confirms, based at least in part on the review confirmation 108, that the user published a verified review 141 for the entity on the review platform 140.

FIG. 3B is a schematic 310 illustrating an embodiment where the POS device 301 confirms that the user published a verified review 141 for the entity on the review platform 140 based at least in part on the review confirmation 108 received from the memory 102 of the contactless card 101. As shown, the POS device 301 outputs one or more rewards for the customer based on the identified review confirmation 108. The user may then select the desired reward. Once selected, the POS device 301 may process the selected reward. If the selected reward is applicable to a previous transaction (e.g., a refund for a previous purchase), the POS device 301 may transmit an indication of the refund to the appropriate server (e.g., the server 120). If the selected reward is for a future transaction, the POS device 301 may store an indication of the selected reward in a user profile for the user. In some embodiments, the POS device 301 stores an indication of the selected reward in the memory 102 of the contactless card 101 and/or the memory 111 of the computing device 110. Doing so allows the POS device 301 to identify the reward in the memory 102 of the contactless card 101 and/or the memory 111 of the computing device 110 at a later time and automatically provide the reward to the user at that time.

Although FIGS. 3A-3C depict embodiments where the contactless card 101 is tapped to the POS device 301, embodiments are not limited in this context. For example, in some embodiments, the contactless card 101 may be tapped to the computing device 110 instead of the POS device 301 in FIG. 3A. In such an embodiment, the contactless card 101 may transmit the review confirmation 108 to the computing device 110. The review application 113 may then transmit the review confirmation 108 to the POS device 301. The POS device 301 may then analyze the review confirmation 108 to determine whether the associated review qualifies the user to receive a reward or other incentive. Any rewards may be transmitted by the POS device 301 to the computing device 110 and/or the review application 113 for display (e.g., via a GUI similar to the GUI of FIG. 3B). Once selected, an indication of the reward may be stored in the memory 111 of the computing device 110. Similarly, the computing device 110 may transmit an indication of the selected reward to the POS device 301, which may store an indication of the selected reward in the user profile for the user.

FIG. 4 illustrates an embodiment of a logic flow 400. The logic flow 400 may be representative of some or all of the operations executed by one or more embodiments described herein. For example, the logic flow 400 may include some or all of the operations to use a contactless card to provide verified reviews. Embodiments are not limited in this context.

As shown, the logic flow 400 begins at block 405, where a user of a review application 113 that is executing on a computing device 110 attempts to provide a review for an entity. As stated, the entity may be any type of merchant and/or service provider. For example, the user may attempt to provide a review for a taxi service. At block 410, the review application 113 may output a notification specifying to tap the contactless card 101 to the computing device 110 to provide a verified review. At block 415, the contactless card 101 is tapped to the computing device 110 which may cause the applet 103 of the contactless card 101 to generate encrypted data 105. As stated, the applet 103 may generate the encrypted data 105 using the private key 104, a cryptographic algorithm, and some other piece of data (e.g., a customer ID). In some embodiments, prior to generating the encrypted data 105, the applet 103 determines whether a transaction in the transaction log 106 reflects that the contactless card 101 was used to pay for a transaction with an entity associated with an entity ID 115 received from the review application 113. At block 420, the applet 103 transmits the encrypted data 105 to the APIs 114 of the device 110. The applet 103 may optionally transmit the transaction log 106 to the device 110 along with the encrypted data 105.

At block 425, the APIs 114 of the review application 113 may receive the encrypted data 105 and/or the transaction log 106 from the contactless card 101. At block 430, the review application 113 may provide the entity ID 115 of the entity and the application ID 116 of the review application 113 to the APIs 114 of the review application 113. At block 435, one or more of the APIs 114 of the review application 113 may transmit the encrypted data, entity ID 115, and application ID 116 to the authentication server 120. At block 440, the authentication application 123 may attempt to decrypt the encrypted data 105 using the private key 104 associated with the contactless card 101 that is stored by the server 120. If the authentication application 123 decrypts the encrypted data 105 to produce the expected result (e.g., a customer identifier associated with the contactless card 101 stored in the account data 124), the authentication application 123 may validate the encrypted data.

At block 445, the authentication application 123 may identify a prior transaction between the contactless card 101 and the entity ID 115 in the transaction data 126. Doing so allows the authentication application 123 to confirm that the user in fact conducted business with the entity that the user wishes to submit the review for. For example, by identifying a record in the transaction data 126 indicating the contactless card 101 was used to pay for taxi services provided by the taxi service entity, the authentication application 123 may confirm that the user, in fact, was a paying customer of the taxi service. At block 450, the authentication application 123 may transmit an indication of confirmation to the device 110. The confirmation may generally indicate that the encrypted data was validated and/or that a valid transaction was identified in the transaction data 126.

Once the review application 113 receives confirmation from the server 120, the review application 113 may permit publication of the verified review. In some embodiments, the review application 113 may disable certain GUI components to restrict the generation and/or submission of a review until confirmation is received from the server 120. For example, the review application 113 may disable the submit button 203 of FIGS. 2A-2B until the confirmation is received. As another example, the review application 113 may not allow the user to provide input to the fields 201-202 until confirmation is received. At block 455, the review application 113 receives input specifying to publish the verified review to the review platform. The review application 113 may then transmit the review to the review platform 140 with an indication that the review is a verified review. The review platform 140 may then store the verified review (including the verified review indication) in the reviews 141. Users may then view the verified review, e.g., using the review application 113.

At block 460, one or more APIs 114 of the review application 113 may transmit an indication of the published review to the contactless card 101, which may store the indication in the memory 102. For example, a review confirmation 108 may be transmitted to the contactless card 101 specifying that the user wrote a verified review for the tax service. At block 465, the contactless card 101 may store the indication of the published review in the memory 102 of the contactless card 101.

FIG. 5 illustrates an embodiment of a logic flow 500. The logic flow 500 may be representative of some or all of the operations executed by one or more embodiments described herein. For example, the logic flow 500 may include some or all of the operations to verify a review based at least in part on data generated by a contactless card. Embodiments are not limited in this context.

As shown, the logic flow 500 begins at block 505, where the authentication application 123 receives data from one or more APIs 114 of the review application 113. For example, the authentication application 123 may receive encrypted data 105 generated by the contactless card 101, the transaction log 106 of the contactless card 101, the entity ID 115, and/or the application ID 116 as part of a request to confirm a verified review. At block 510, the authentication application 123 attempts to decrypt the encrypted data 105 using the private key 104 of the server 120 to yield the customer ID associated with the contactless card. At block 515, the authentication application 123 may search the transaction data 126 to identify a transaction between the contactless card 101 and the entity ID. For example, if the entity ID 115 is associated with a restaurant, the authentication application 123 may identify a record in the transaction data 126 indicating the contactless card 101 was used to pay for a meal at the restaurant.

At block 520, the authentication application 123 determines whether a time associated with the transaction identified at block 515 exceeds a time limit (or threshold). For example, the authentication application 123 may have a threshold of 10 days for a transaction. If the identified transaction occurred within 10 days, the authentication application 123 may confirm the transaction for the verified review. Otherwise, the authentication application 123 may decline to confirm the transaction for the verified review. At block 525, the authentication application 123 determines whether the review limit is exceeded by the current review. As stated, the authentication application 123 may maintain a review counter associated with the contactless card 101. If incrementing the review counter based on the current review causes the counter to exceed the limit, the authentication application 123 may decline to confirm the transaction for the verified review. Otherwise, the authentication application 123 may confirm the transaction for the verified review.

At block 530, the authentication application 123 may reject the verified review, and/or refrain from transmitting a confirmation to the review application 113. For example, the authentication application 123 may reject the verified review based on a determination that the encrypted data 105 was not decrypted, that a transaction was not identified in the transaction data 126, or that the time and/or review limits were exceeded. Doing so causes the review application 113 to restrict the user from publishing the verified review. Additionally and/or alternatively, the review application 113 may permit the user to publish a review but not provide the verified status to the review. At block 535, the authentication application 123 may transmit an indication of approval, e.g., a confirmation, for the verified review requested by the review application 113. For example, the authentication application 123 may successfully decrypt the encrypted data 105, identify one or more transactions in the transaction data 126, and determine that the identified transactions do not exceed the time limit and/or the review limit. As another example, the authentication application 123 may further determine that a transaction exists in the received transaction log 106 of the contactless card 101. Doing so allows the authentication application 123 to confirm that the requested review is not fraudulent based on the decryption of the encrypted data and the identification of a recent transaction between the user and the entity.

FIG. 6 illustrates an embodiment of a logic flow 600. The logic flow 600 may be representative of some or all of the operations executed by one or more embodiments described herein. For example, the logic flow 600 may include some or all of the operations to use a contactless card for verified reviews. Embodiments are not limited in this context.

As shown, the logic flow 600 begins at block 605, where the review application 113 identifies one or more transactions in the transaction log 106 received from the contactless card 101. At block 610, the review application 113 may determine that a transaction in the transaction log 106 indicates the contactless card 101 was used to pay for a transaction with the entity the user is attempting to publish a verified review. For example, the entity ID of the entity may be specified in the transaction log 106. At block 615, the review application 113 determines that the transaction identified at block 610 is within a time threshold. For example, the review application 113 may determine that the transaction has a timestamp indicating the transaction is 3 days old, while the time threshold is 30 days. The review application 113 may make the determinations at blocks 610-615 prior to transmitting at least the encrypted data 105 to the server 120 for validation. The validation may occur as described above, and the user may optionally submit a verified review based on a confirmation received by the review application 113 from the server 120.

At block 620, the review application 113 may identify, in the transaction log 106 received from the contactless card 101, a transaction with a second entity. At block 625, the review application 113 may output a notification requesting that the user write a review for the second entity. The user may then determine to write a review for the second entity, which may be verified using the contactless card 101 as described herein.

FIG. 7 illustrates an embodiment of a logic flow 700. The logic flow 700 may be representative of some or all of the operations executed by one or more embodiments described herein. For example, the logic flow 700 may include some or all of the operations to provide rewards based on indications of published reviews stored in a contactless card. Embodiments are not limited in this context.

As shown, the logic flow 700 begins at block 705, where a merchant device, such as the POS device 301, outputs an indication to tap a contactless card 101 to the POS device 301 and/or insert the contactless card 101 into the POS device 301. At block 710, the POS device 301 receives data from the contactless card 101. For example, the applet 103 may transmit one or more review confirmations 108 stored in the memory 102 to the POS device 301. At block 715, the merchant device identifies an indication that the user submitted a verified review for an entity associated with the POS device 301. For example, the POS device 301 may compare the entity ID 115 in the received review confirmation 108 and determine that the entity ID 115 is associated with the entity providing the POS device 301.

At block 720, the POS device 301 outputs one or more rewards, discounts, and/or incentives for display. For example, the POS device 301 may offer discounts for future purchases, upgrades for future purchases, and/or refunds for previous purchases. At block 725, the POS device 301 receives a selection of one or more rewards outputted at block 720. For example, the user may select an upgraded hotel room for their next stay. At block 730, the POS device 301 may apply the selected reward to the user's account. For example, POS device 301 may store an indication to upgrade the user's room during their next hotel stay. At block 735, the POS device 301 transmits an indication of a refund for a previous purchase upon determining the reward selected at block 725 is a refund for a previous purchase. For example, if the user selects a 5% discount on the last purchase which totaled $100, the POS device 301 may transmit an indication of a refund of $5 to the account associated with the contactless card 101 to the server 120.

Figure 8:
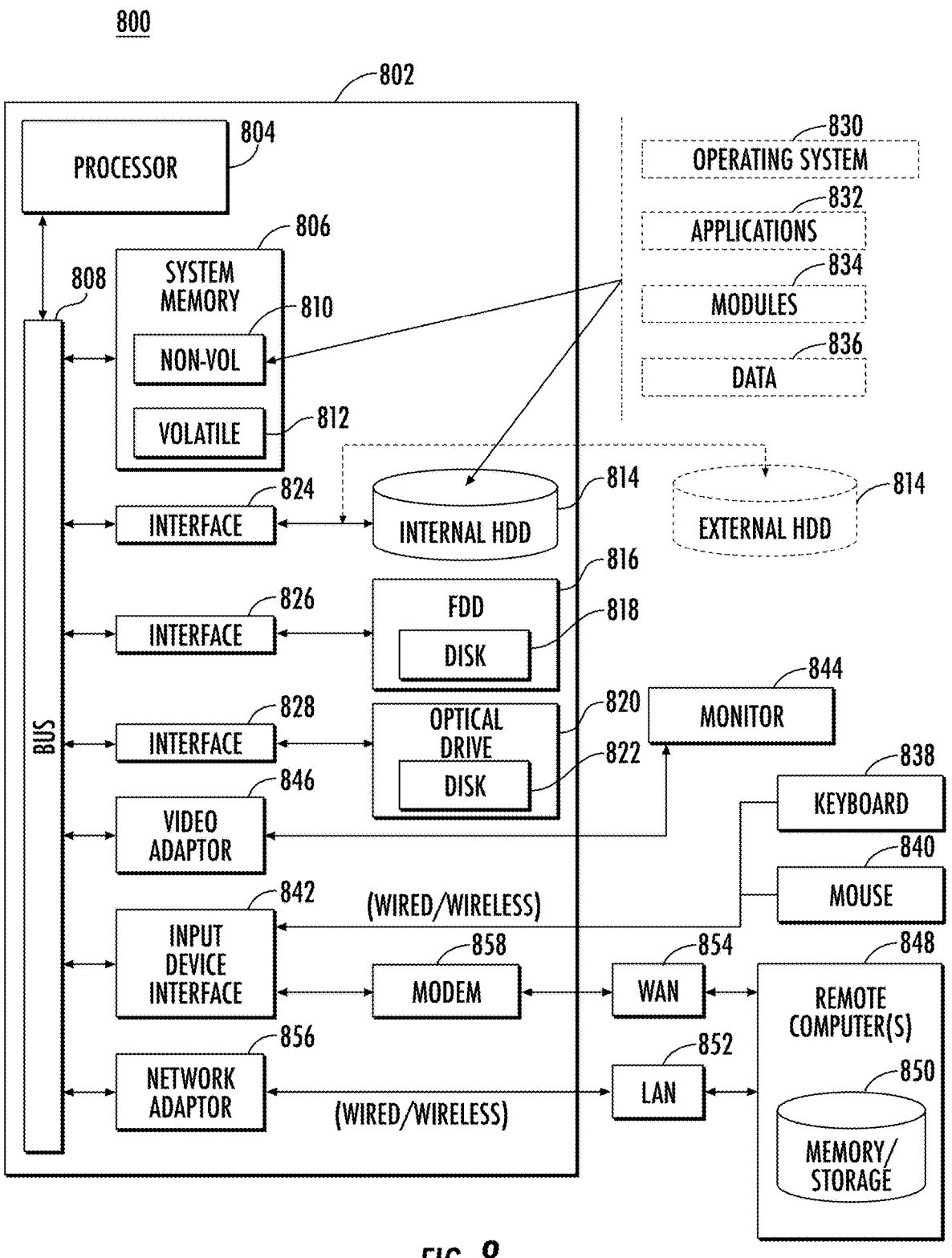
FIG. 8 illustrates an embodiment of a computing architecture.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the system 100. In some embodiments, computing system 802 may be representative, for example, of the contactless card 101, computing devices 110, authentication server 120, and/or review platforms 140 of the system 100. Similarly, computing system 802 may be representative of the POS device 301. The embodiments are not limited in this context. More generally, the computing architecture 800 is configured to implement all logic, applications, systems, methods, apparatuses, and functionality described herein with reference to FIGS. 1-9.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by an HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-9.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100, e.g., the applet 103, private keys 104, encrypted data 105, transaction log 106, review application 113, APIs 114, the authentication application 123, the account data 124, the entity data 125, the transaction data 126, the review platform 140, and/or the reviews 141.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9A:
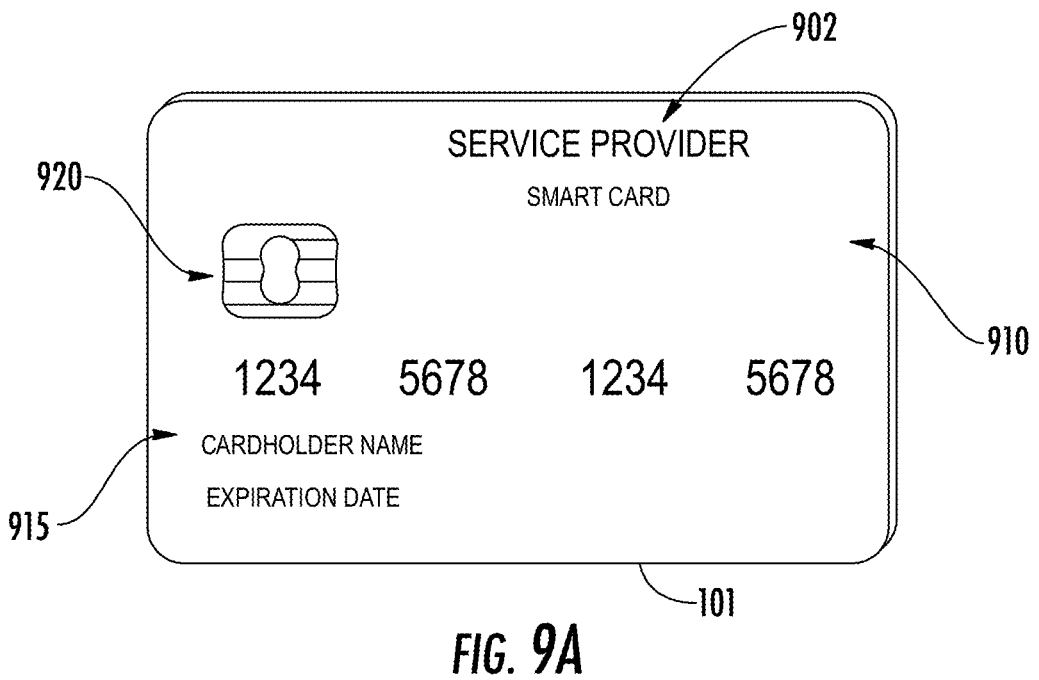
FIGS. 9A-9B illustrate an example contactless card.

FIG. 9A illustrates a contactless card 101, which may comprise a payment card, such as a credit card, debit card, and/or a gift card. As shown, the contactless card 101 may be issued by a service provider 902 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 910, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 915 displayed on the front and/or back of the card, and a contact pad 920. The contact pad 920 may be configured to establish contact with another communication device, such as the mobile devices 90, a user device, smart phone, laptop, desktop, or tablet computer. The contactless card 101 may also include processing circuitry, antenna and other components not shown in FIG. 9A. These components may be located behind the contact pad 920 or elsewhere on the substrate 910. The contactless card 101 may also include a magnetic strip or tape, which may be located on the back of the card (not shown in FIG. 9A).

Figure 9B:
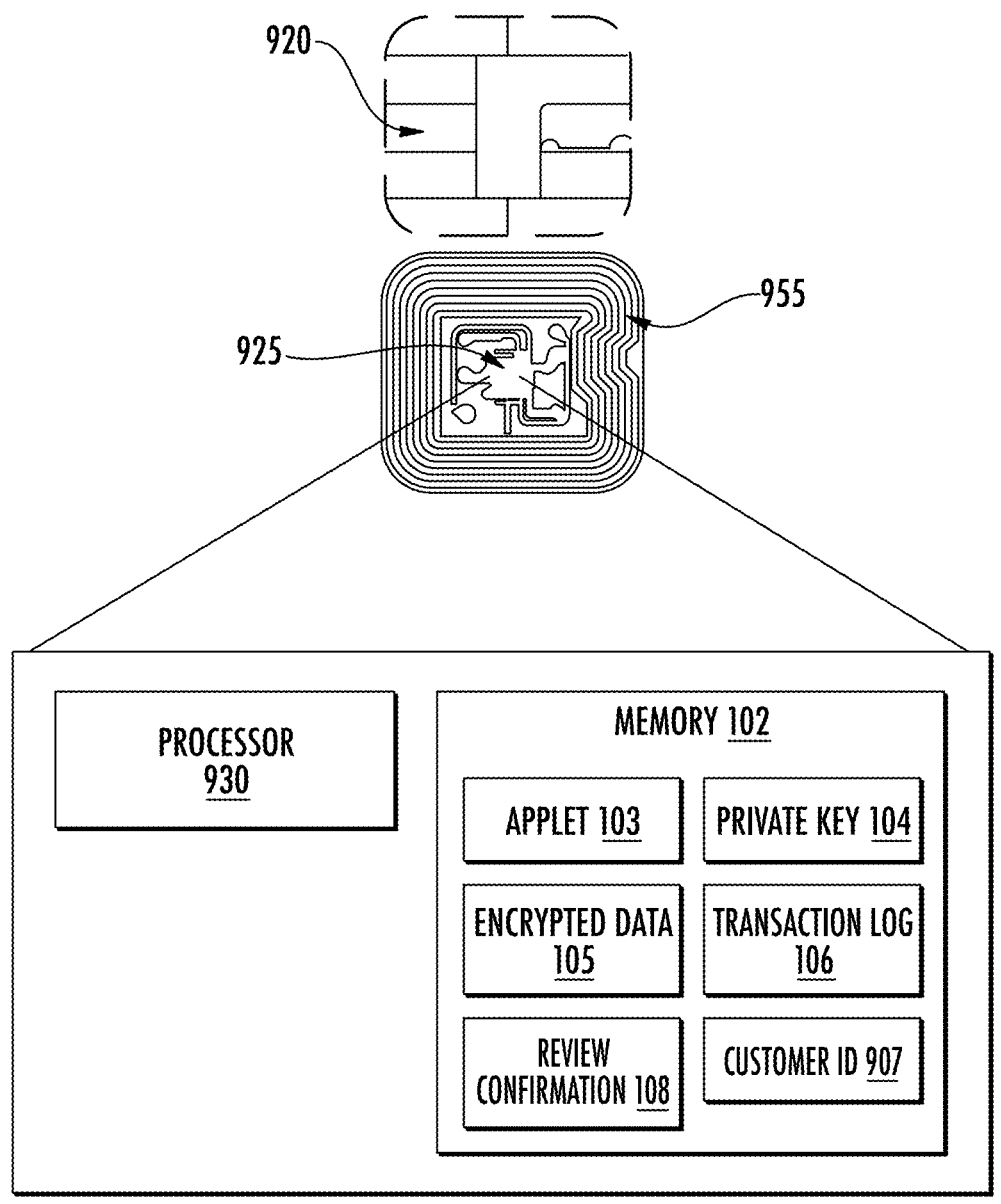

As illustrated in FIG. 9B, the contact pad 920 of contactless card 101 may include processing circuitry 925 for storing and processing information, including a microprocessor 930 and the memory 102. It is understood that the processing circuitry 925 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store one or more applets 103, the private key 104, the encrypted data 105, the transaction log 106, one or more review confirmations 108, and one or more customer (or user) identifiers (IDs) 907. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The customer ID 907 may comprise a unique alphanumeric identifier assigned to a user of the contactless card 101, and the identifier may distinguish the user of the contactless card from other contactless card users. In some examples, the customer ID 907 may identify both a customer and an account assigned to that customer and may further identify the contactless card associated with the customer's account. In some embodiments, the applet 103 may use the customer ID 907 as input to a cryptographic algorithm with the private key 104 to generate the encrypted data 105.

The processor and memory elements of the foregoing exemplary embodiments are described with reference to the contact pad, but the present disclosure is not limited thereto. It is understood that these elements may be implemented outside of the pad 920 or entirely separate from it, or as further elements in addition to processor 930 and memory 102 elements located within the contact pad 920.

In some examples, the contactless card 101 may comprise one or more antennas 955. The one or more antennas 955 may be placed within the contactless card 101 and around the processing circuitry 925 of the contact pad 920. For example, the one or more antennas 955 may be integral with the processing circuitry 925 and the one or more antennas 955 may be used with an external booster coil. As another example, the one or more antennas 955 may be external to the contact pad 920 and the processing circuitry 925.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 955, processing circuitry 925, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., the card reader 118 of the device 110), and produce an NDEF message that comprises a cryptographically secure OTP encoded as an NDEF text tag.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
   a processor; and
   a memory storing instructions which when executed by the processor, cause the processor to:
   receive, by an application executing on the processor, a request to publish a review for an entity to a review platform, wherein a review submission element of a graphical user interface (GUI) of the application is disabled;
   receive, by the application, encrypted data from a contactless card;
   transmit, by the application to a server: (i) the encrypted data, and (ii) an entity identifier associated with the entity;
   receive, by the application from the server, indications specifying that the server: (i) decrypted the encrypted data, and (ii) determined that the contactless card was used to make a purchase with the entity;
   enable, by the application based on the indications received from the server, the review submission element of the GUI of the application; and
   publish, by the application, the review to the review platform based on the indications received from the server.

2. The apparatus of claim 1, the memory storing instructions which when executed by the processor cause the processor to, prior to approving the request:

receive, from the contactless card, transaction data for one or more previous transactions for which the contactless card was used to provide payment information; and determine that the entity identifier is specified in the transaction data for the one or more previous transactions, wherein the application publishes the request based at least in part on the determination that the entity identifier is specified in the transaction data for the one or more previous transactions.

3. The apparatus of claim 1, the memory storing instructions which when executed by the processor cause the processor to:

transmit, by the application to the contactless card, a review confirmation specifying that the review was published to the review platform;

receive, by the application from the contactless card, the review confirmation specifying that the review was published to the review platform;

transmit, by the application to a point of sale device associated with the entity, the received review confirmation specifying that the review was published to the review platform; and receive, by the application from the point of sale device based on the review confirmation, an indication of a reward for at least one of: (i) the purchase, and (ii) a subsequent purchase.

4. The apparatus of claim 1, the memory storing instructions which when executed by the processor cause the processor to:

receive, by the application, a second request to publish a review for a second entity to the review platform;

receive, by the application, a second encrypted data from the contactless card;

transmit, by the application to the server: (i) the second encrypted data, (ii) an application identifier of the application, and (iii) an entity identifier associated with the second entity;

receive, by the application from the server, at least one of: (i) an indication specifying the server did not decrypt the second encrypted data, or (ii) an indication specifying the server determined that the contactless card was not used to make a purchase with the second entity; and reject, by the application, the second request to publish the review based on the at least one indication received from the server.

5. The apparatus of claim 4, wherein the application rejects the second request based on the indication specifying the server did not decrypt the second encrypted data and the indication specifying the server determined that the contactless card was not used to make a purchase with the second entity.

6. The apparatus of claim 1, the memory storing instructions which when executed by the processor cause the processor to approve, by the application, the request to publish the review based on the indications received from the server.

7. The apparatus of claim 1, wherein the review submission element is operative to submit reviews for publication when enabled.

8. A non-transitory computer-readable storage medium storing instructions which when executed by a processor of a device cause the processor to:

receive, by an application executing on the processor, a request to publish a review for an entity to a review platform, wherein a review submission element of a graphical user interface (GUI) of the application is disabled;

receive, by the application, encrypted data from a contactless card;

transmit, by the application to a server: (i) the encrypted data, and (ii) an entity identifier associated with the entity;

receive, by the application from the server, indications specifying that the server: (i) decrypted the encrypted data, and (ii) determined that the contactless card was used to make a purchase with the entity;

enable, by the application based on the indications received from the server, the review submission element of the GUI of the application; and publish, by the application, the review to the review platform based on the indications received from the server.

9. The non-transitory computer-readable storage medium of claim 8, storing instructions which when executed by the processor cause the processor to, prior to approving the request:

receive, from the contactless card, transaction data for one or more previous transactions for which the contactless card was used to provide payment information; and determine that the entity identifier is specified in the transaction data for the one or more previous transactions, wherein the application approves the request based at least in part on the determination that the entity identifier is specified in the transaction data for the one or more previous transactions.

10. The non-transitory computer-readable storage medium of claim 8, storing instructions which when executed by the processor cause the processor to:

transmit, by the application to the contactless card, a review confirmation specifying that the review was published to the review platform;

receive, by the application from the contactless card, the review confirmation specifying that the review was published to the review platform;

transmit, by the application to a point of sale device associated with the entity, the received review confirmation specifying that the review was published to the review platform; and receive, by the application from the point of sale device based on the review confirmation, an indication of a reward for at least one of: (i) the purchase, and (ii) a subsequent purchase.

11. The non-transitory computer-readable storage medium of claim 8, storing instructions which when executed by the processor cause the processor to:

receive, by the application, a second request to publish a review for a second entity to the review platform;

receive, by the application, a second encrypted data from the contactless card;

transmit, by the application to the server: (i) the second encrypted data, (ii) an application identifier of the application, and (iii) an entity identifier associated with the second entity;

receive, by the application from the server, at least one of: (i) an indication specifying the server did not decrypt the second encrypted data, or (ii) an indication specifying the server determined that the contactless card was not used to make a purchase with the second entity; and reject, by the application, the second request to publish the review based on the at least one indication received from the server.

12. The non-transitory computer-readable storage medium of claim 8, storing instructions which when executed by the processor cause the processor to, prior to publishing the review to the review platform:

receive, by the application, input comprising the review for the entity.

13. The non-transitory computer-readable storage medium of claim 8, storing instructions which when executed by the processor cause the processor to approve, by the application, the request to publish the review based on the indications received from the server.

14. The non-transitory computer-readable storage medium of claim 8, wherein the review submission element is operative to submit reviews for publication when enabled.

15. A method, comprising:

receiving, by an application executing on a processor of a device, a request to publish a review for an entity to a review platform, wherein a review submission element of a graphical user interface (GUI) of the application is disabled;

receiving, by the application, encrypted data from a contactless card;

transmitting, by the application to a server: (i) the encrypted data, and (ii) an entity identifier associated with the entity;

receiving, by the application from the server, indications specifying that the server: (i) decrypted the encrypted data, and (ii) determined that the contactless card was used to make a purchase with the entity;

enabling, by the application based on the indications received from the server, the review submission element of the GUI of the application; and publishing, by the application, the review to the review platform based on the indications received from the server.

16. The method of claim 15, further comprising prior to approving the request:

receiving, from the contactless card, transaction data for one or more previous transactions for which the contactless card was used to provide payment information; and determining that the entity identifier is specified in the transaction data for the one or more previous transactions, wherein the application approves the request based at least in part on the determination that the entity identifier is specified in the transaction data for the one or more previous transactions.

17. The method of claim 15, further comprising:

transmitting, by the application to the contactless card, a review confirmation specifying that the review was published to the review platform;

receiving, by the application from the contactless card, the review confirmation specifying that the review was published to the review platform;

transmitting, by the application to a point of sale device associated with the entity, the received review confirmation specifying that the review was published to the review platform; and receiving, by the application from the point of sale device based on the review confirmation, an indication of a reward for at least one of: (i) the purchase, and (ii) a subsequent purchase.

18. The method of claim 15, further comprising:

outputting, by the application, an indication specifying to tap the contactless card to the device to approve the request.

19. The method of claim 15, further comprising approving, by the application, the request to publish the review based on the indications received from the server.

20. The method of claim 15, wherein the review submission element is operative to submit reviews for publication when enabled.

* * * * *